(12) United States Patent
Alahyari et al.

(10) Patent No.: US 11,817,761 B2
(45) Date of Patent: Nov. 14, 2023

(54) AIRCRAFT ELECTRIC MOTOR

(71) Applicant: Hamilton Sundstrand Corporation, Charlotte, NC (US)

(72) Inventors: Abbas A. Alahyari, Glastonbury, CT (US); Joseph Turney, Amston, CT (US); Jagadeesh Kumar Tangudu, South Windsor, CT (US); Kimberly Rae Saviers, Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 27 days.

(21) Appl. No.: 17/519,749

(22) Filed: Nov. 5, 2021

(65) Prior Publication Data

US 2023/0141526 A1    May 11, 2023

(51) Int. Cl.
*H02K 9/20* (2006.01)
*H02K 5/20* (2006.01)
*H02K 11/33* (2016.01)
*B64D 27/24* (2006.01)
(Continued)

(52) U.S. Cl.
CPC ............. *H02K 5/203* (2021.01); *B64D 27/24* (2013.01); *B64D 33/08* (2013.01); *H02K 9/20* (2013.01); *H02K 11/33* (2016.01); *H02K 21/22* (2013.01)

(58) Field of Classification Search
CPC .. H02K 1/20; H02K 9/00; H02K 9/02; H02K 9/04; H02K 9/06; H02K 9/08; H02K 9/10; H02K 9/12; H02K 9/14; H02K 9/16; H02K 9/19; H02K 9/193; H02K 9/197; H02K 9/20; H02K 5/203; H02K 21/22; B64D 27/24; B64D 33/08

USPC ..... 310/52, 54, 55, 57, 58, 59, 60 R, 61, 62, 310/63, 60 A, 64
See application file for complete search history.

(56) References Cited

U.S. PATENT DOCUMENTS

| | | | |
|---|---|---|---|
| 4,822,250 A | * | 4/1989 | Tsubouchi ............. F04B 43/04 417/322 |
| 8,427,019 B2 | | 4/2013 | Garriga et al. |
| 10,945,354 B1 | * | 3/2021 | Dede .................. H05K 7/20272 |

(Continued)

FOREIGN PATENT DOCUMENTS

| | | |
|---|---|---|
| CN | 107196462 A | 9/2017 |
| DE | 29702117 U1 | 6/1998 |

(Continued)

OTHER PUBLICATIONS

Huber et al., Cooling Device for a Stator of an Electrical Machine, Mar. 26, 2020, DE 102018216301 (English Machine Translation) (Year: 2020).*

(Continued)

*Primary Examiner* — Alexander A Singh
(74) *Attorney, Agent, or Firm* — CANTOR COLBURN LLP (57) ABSTRACT

Aircraft electric motors are described. The aircraft electric motors include a motor unit having a rotor and a stator, wherein the stator includes a plurality of windings and cooling channels arranged to provide cooling to the plurality of windings, a drive unit configured to drive operation of the motor unit, and a cooling system having at least one directional feature forming a portion of at least one cooling channel, the at least one directional feature configured to prevent backflow of a cooling fluid that passes through the at least one cooling channel.

20 Claims, 11 Drawing Sheets

(51) Int. Cl.
*B64D 33/08* (2006.01)
*H02K 21/22* (2006.01)

(56) References Cited

U.S. PATENT DOCUMENTS

| | | | |
|---|---|---|---|
| 11,025,108 B2 | 6/2021 | Yun et al. | |
| 2003/0235504 A1 | 12/2003 | Lemoff et al. | |
| 2017/0162280 A1* | 6/2017 | Loewen | F16K 15/02 |
| 2019/0103786 A1* | 4/2019 | Shaik | H02K 3/24 |
| 2019/0393759 A1* | 12/2019 | Huang | H02K 5/18 |

FOREIGN PATENT DOCUMENTS

| | | | |
|---|---|---|---|
| DE | 102018216301 A1 * | 3/2020 | |
| EP | 3672029 A1 | 6/2020 | |

OTHER PUBLICATIONS

Extended European Search Report dated Mar. 23, 2023; EP Application No. 22193943.2-1202; 7 pages.

* cited by examiner

AIRCRAFT ELECTRIC MOTOR

This invention was made with government support under Contract No. DE-AR0001351 awarded by the U.S. Department of Energy. The government has certain rights in the invention.

BACKGROUND

The present disclosure relates to electric motors, and more particularly, to electric motor assemblies with high efficiency and power density with a light weight for aircraft applications.

Traditional electric motors may include a stator and a rotor, with electrical motor windings in the stator that, when energized, drive rotation of the rotor about a central axis. Heat is generated in the motor windings, which are located in slots in the stator. The windings are separated from the exterior of the motor by layers of insulation and laminated steel, which makes up the stator. These contributors to internal thermal resistance limit the allowable heat generation and thus the allowable electrical current in the windings. The energy density of an electric motor is typically limited by heat dissipation from the motor windings of the stator. The requirement to be met is a maximum hot spot temperature in the motor windings that is not to be exceeded. Conventional motor thermal management includes natural convection from large fins on the outside of a motor jacket, or liquid cooling in the motor jacket. Both of these solutions undesirably add volume and/or weight to the motor, due to the addition of, at least, the jacket.

BRIEF DESCRIPTION

According to some embodiments of the present disclosure, aircraft electric motors are provided. The aircraft electric motors include a motor unit having a rotor and a stator, wherein the stator includes a plurality of windings and cooling channels arranged to provide cooling to the plurality of windings, a drive unit configured to drive operation of the motor unit, and a cooling system having at least one directional feature forming a portion of at least one cooling channel, the at least one directional feature configured to prevent backflow of a cooling fluid that passes through the at least one cooling channel.

In addition to one or more of the features described herein, or as an alternative, further embodiments of the aircraft electric motors may include that the at least one directional feature comprises a plurality of directional features distributed between an inlet of the at least one cooling channel to an outlet of the at least one cooling channel.

In addition to one or more of the features described herein, or as an alternative, further embodiments of the aircraft electric motors may include that the at least one directional feature is a Tesla valve.

In addition to one or more of the features described herein, or as an alternative, further embodiments of the aircraft electric motors may include that the at least one directional feature is a series of helical grooves.

In addition to one or more of the features described herein, or as an alternative, further embodiments of the aircraft electric motors may include that the at least one directional feature is a series of rings, wherein each ring has an angled sidewall that has a larger diameter than an upstream directional feature at the upstream end of the angled sidewall.

In addition to one or more of the features described herein, or as an alternative, further embodiments of the aircraft electric motors may include that the at least one cooling channel defines an inlet portion, a mid-channel portion, and an outlet portion.

In addition to one or more of the features described herein, or as an alternative, further embodiments of the aircraft electric motors may include that the at least one directional feature is located within the inlet portion.

In addition to one or more of the features described herein, or as an alternative, further embodiments of the aircraft electric motors may include that the at least one directional feature is located within the outlet portion.

In addition to one or more of the features described herein, or as an alternative, further embodiments of the aircraft electric motors may include that the at least one directional feature is located within the mid-channel portion.

In addition to one or more of the features described herein, or as an alternative, further embodiments of the aircraft electric motors may include that the at least one directional feature comprises at least one feature in the inlet portion and at least one feature in the outlet portion.

In addition to one or more of the features described herein, or as an alternative, further embodiments of the aircraft electric motors may include that the mid-channel portion does not include any directions features.

In addition to one or more of the features described herein, or as an alternative, further embodiments of the aircraft electric motors may include that the at least one feature within the inlet portion is different from the at least one feature in the outlet portion.

In addition to one or more of the features described herein, or as an alternative, further embodiments of the aircraft electric motors may include that the at least one feature within the inlet portion is the same as the at least one feature in the outlet portion.

In addition to one or more of the features described herein, or as an alternative, further embodiments of the aircraft electric motors may include that the windings are arranged in a U-shape configuration.

In addition to one or more of the features described herein, or as an alternative, further embodiments of the aircraft electric motors may include that the motor unit comprises rotor having U-shaped magnets arranged about the windings of the stator.

In addition to one or more of the features described herein, or as an alternative, further embodiments of the aircraft electric motors may include that the cooling system further includes a header and a heat exchanger configured to supply cooling fluid into the plurality of cooling channels.

In addition to one or more of the features described herein, or as an alternative, further embodiments of the aircraft electric motors may include a pump configured to pump the cooling fluid from the header into the plurality of cooling channels.

In addition to one or more of the features described herein, or as an alternative, further embodiments of the aircraft electric motors may include that the rotor and stator are arranged in an annular configuration.

In addition to one or more of the features described herein, or as an alternative, further embodiments of the aircraft electric motors may include that the at least one directional feature is configured to cause a phase change in the cooling fluid.

In addition to one or more of the features described herein, or as an alternative, further embodiments of the aircraft electric motors may include that the cooling fluid is one of a hydrofluorocarbon (HFC), a hydrofluro-olefin (HFO), or a hydrofluoroether (HFE).

According to some embodiments, aircraft electric motors are provided. The aircraft electric motors include a motor unit having a rotor and a stator, wherein the stator includes a plurality of windings and cooling channels arranged to provide cooling to the plurality of windings, a means for driving operation of the motor unit, and a cooling system. The cooling system includes at least one means for supplying cooling fluid to a portion of the stator and at least one means for preventing backflow of the cooling fluid within the at least one means for supplying cooling fluid.

In addition to one or more of the features described herein, or as an alternative, further embodiments of the aircraft electric motors may include that the means for driving operation of the motor unit comprises at least one power module system, the at least one means for supplying cooling fluid comprises at least one cooling channel, and the at least one means for preventing backflow is at least one directional feature formed in a respective one of the at least one cooling channel.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

DETAILED DESCRIPTION

Figure 1A:
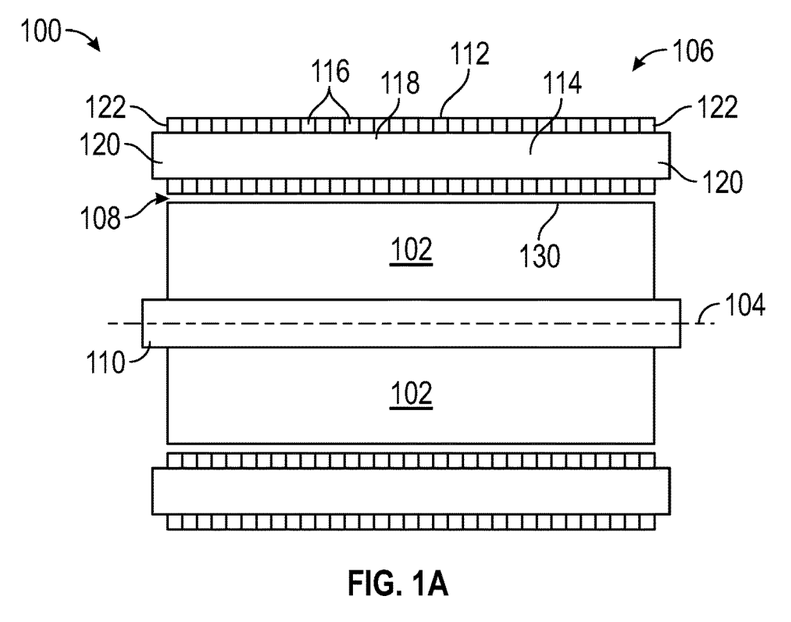
FIG. 1A is a partial view of an embodiment of electric motor.
Figure 1B:
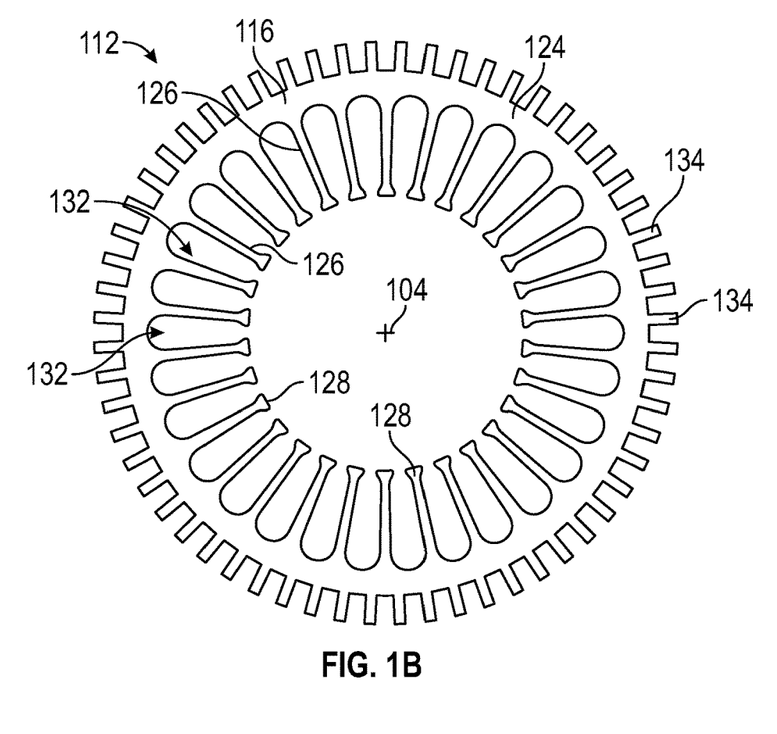
FIG. 1B is a cross-sectional view of an embodiment of a stator core of the electric motor of FIG. 1A.

Referring to FIGS. 1A-1B, schematic illustrations of an electric motor 100 that may incorporate embodiments of the present disclosure are shown. FIG. 1A illustrates a cross-sectional view of the electric motor 100 and FIG. 1B illustrates a cross-sectional view of a stator core of the electric motor 100. The electric motor 100 includes a rotor 102 configured to rotate about a rotation axis 104. A stator 106 is located radially outboard of the rotor 102 relative to the rotation axis 104, with a radial air gap 108 located between the rotor 102 and the stator 106. As illustrated, the rotor 102 may be mounted on a shaft 110 which may impart rotational movement to the rotor 102 or may be driven by rotation of the rotor 102, as will be appreciated by those of skill in the art. The rotor 102 and the shaft 110 may be fixed together such that the rotor 102 and the shaft 110 rotate about the rotation axis 104 together as one piece.

The stator 106 includes a stator core 112 in which a plurality of electrically conductive stator windings 114 are disposed. In some embodiments, such as shown in FIG. 1A, the stator core 112 is formed from a plurality of axially stacked laminations 116, which are stacked along the rotation axis 104. In some embodiments, the laminations 116 are formed from a steel material, but one skilled in the art will readily appreciate that other materials may be utilized. The stator windings 114, as shown, include core segments 118 extending through the stator core 112 and end turn segments 120 extending from each axial stator end 122 of the stator core 112 and connecting circumferentially adjacent core segments 118. When the stator windings 114 are energized via an electrical current therethrough, the resulting field drives rotation of the rotor 102 about the rotation axis 104. Although FIG. 1A illustrates the stator core 112 arranged radially inward from the stator windings 114, it will be appreciated that other configurations are possible without departing from the scope of the present disclosure. For example, in some embodiments, the stator structure may be arranged radially inward from a rotating rotor structure.

FIG. 1B is an axial cross-sectional view of the stator core 112. Each lamination 116 of the stator core 112 includes a radially outer rim 124 with a plurality of stator teeth 126 extending radially inwardly from the outer rim 124 toward the rotation axis 104. Each of the stator teeth 126 terminate at a tooth tip 128, which, together with a rotor outer surface 130 (shown in FIG. 1A) of the rotor 102, may define the radial air gap 108. Circumferentially adjacent stator teeth 126 define an axially-extending tooth gap 132 therebetween. Further, in some embodiments, a plurality of stator fins 134 extend radially outwardly from the outer rim 124.

Electric motors, as shown in FIGS. 1A-1B may require cooling due to high density configurations, various operational parameters, or for other reasons. For example, high-power-density aviation-class electric motors and drives may require advanced cooling technologies to ensure proper operation of the motors/drives. These machines are generally thermally limited at high power ratings and their performance can be improved by mitigating thermal limitations. To maintain desired temperatures, a thermal management system (TMS) is integrated into the system, which provides cooling to components of the system.

Onboard an aircraft, power requirements, and thus thermal management system (TMS) loads, are substantially higher during takeoff. Sizing of the TMS for takeoff conditions (i.e., maximum loads) results in a TMS having a high weight to accommodate such loads. This results in greater weight and lower power density during cruise conditions which do not generate such loads, and thus does not require a high cooling capacity TMS. Balancing weight constraints and thermal load capacities is important for such aviation applications.

In view of such considerations, improved aviation electric motors are provided herein. The aviation electric motors or aircraft electric motors, described herein, incorporate lightweight materials and compact design to reduce weight, improve thermal efficiencies, improve power efficiencies, and improve power density.

Figure 2A:
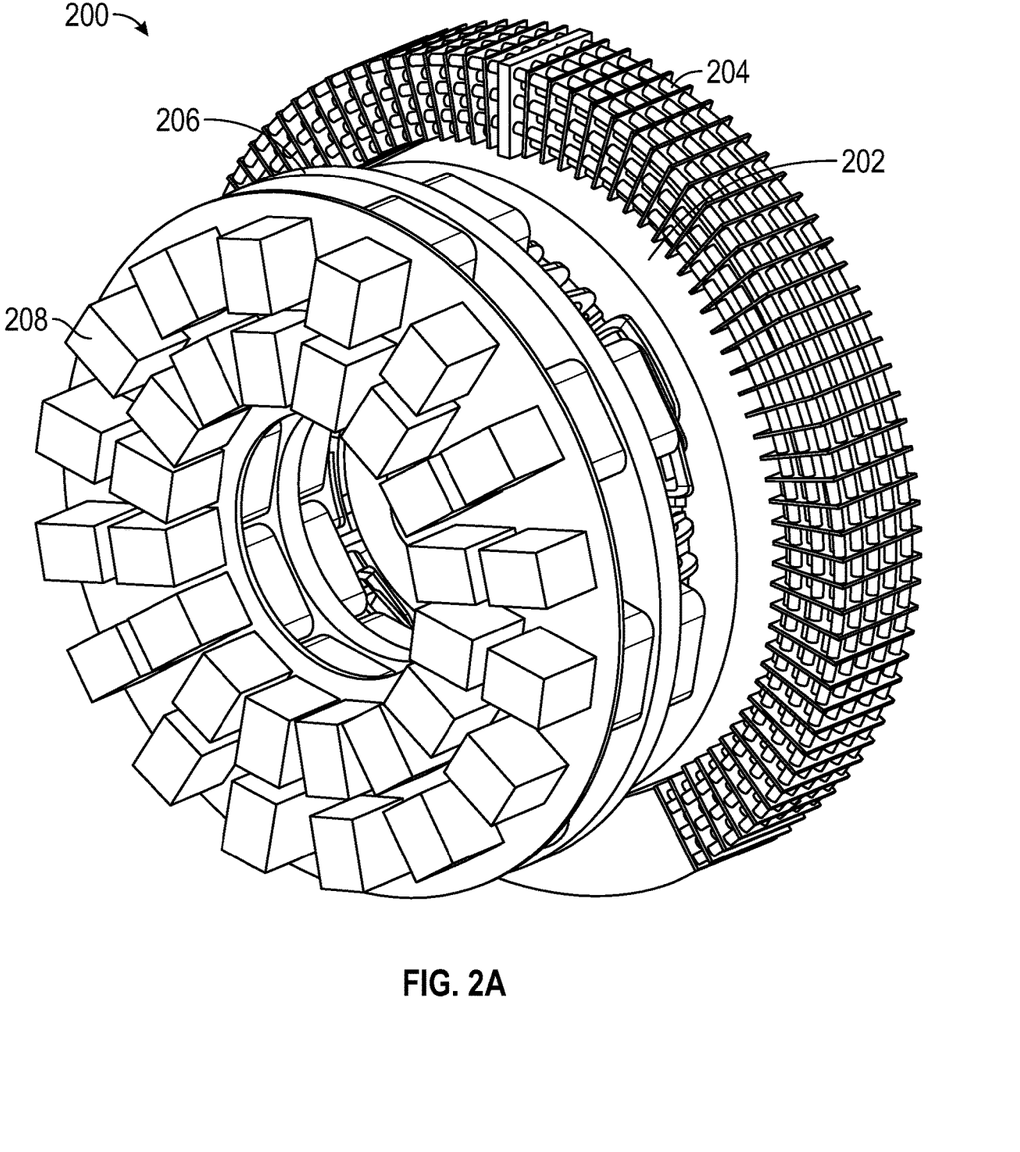
FIG. 2A is a schematic illustration of an aircraft electric motor in accordance with an embodiment of the present disclosure.
Figure 2B:
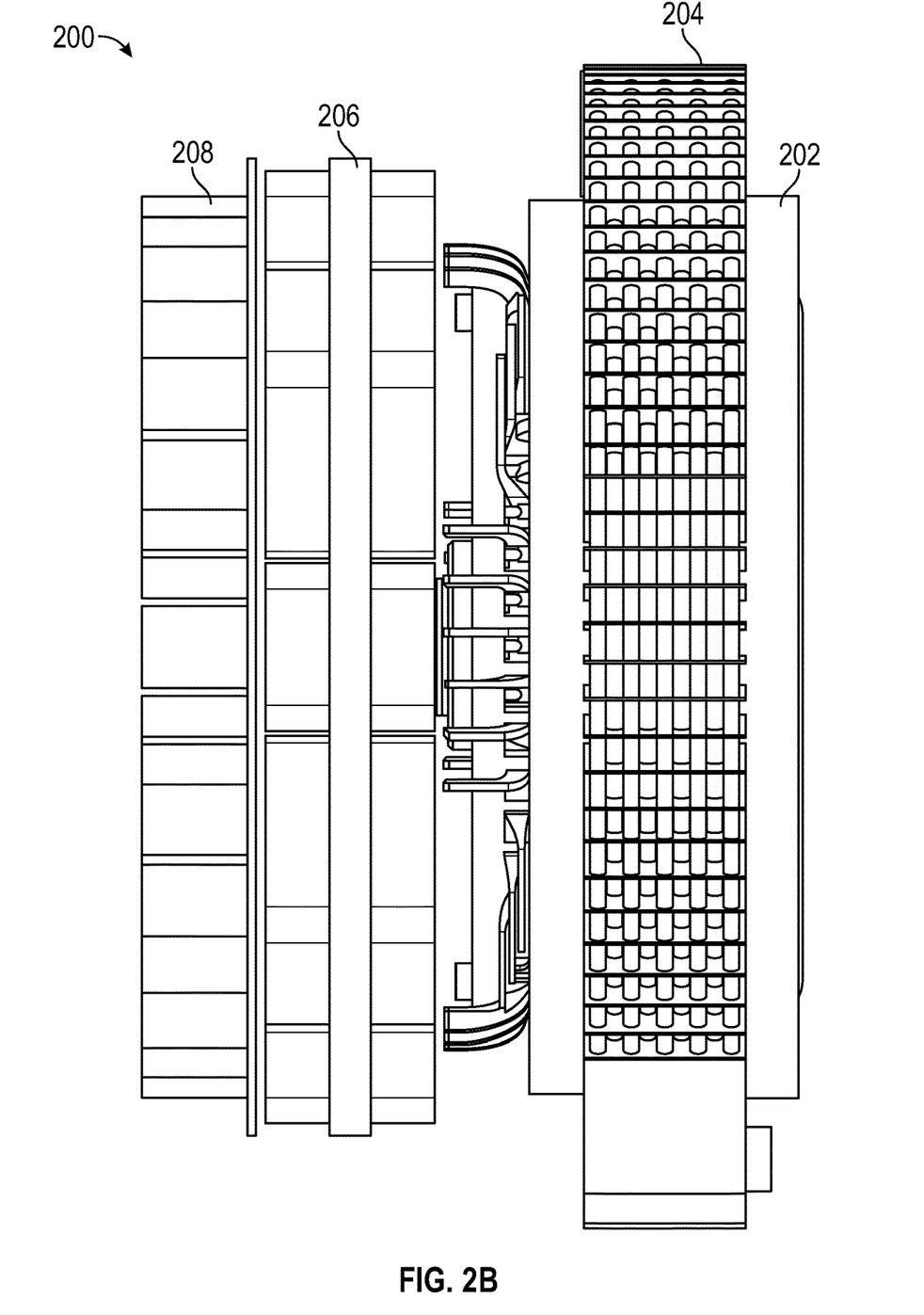
FIG. 2B is a side elevation view of the aircraft electric motor of FIG. 2A.
Figure 2C:
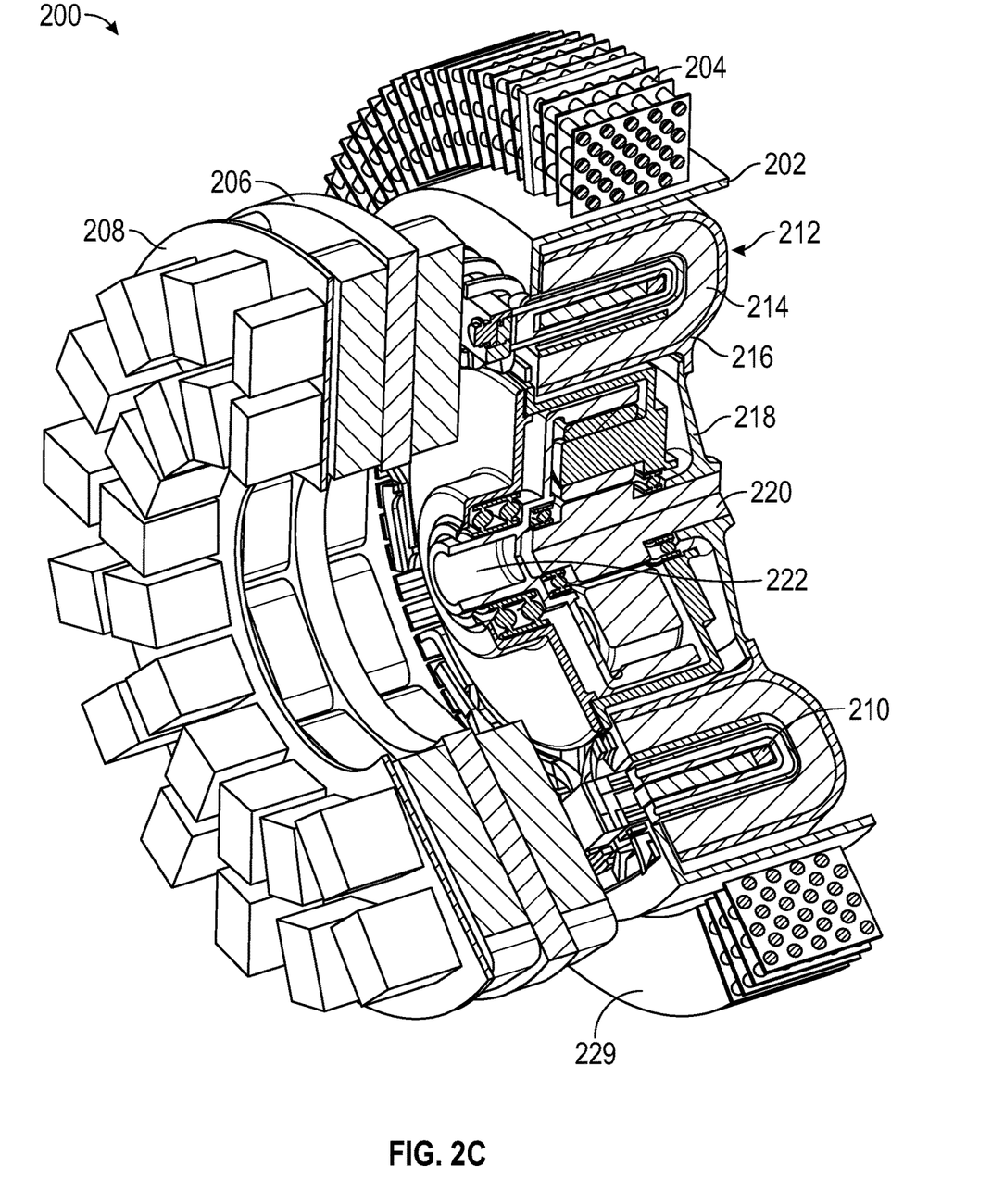
FIG. 2C is a partial cut-away illustration of the aircraft electric motor of FIG. 2A.
Figure 2D:
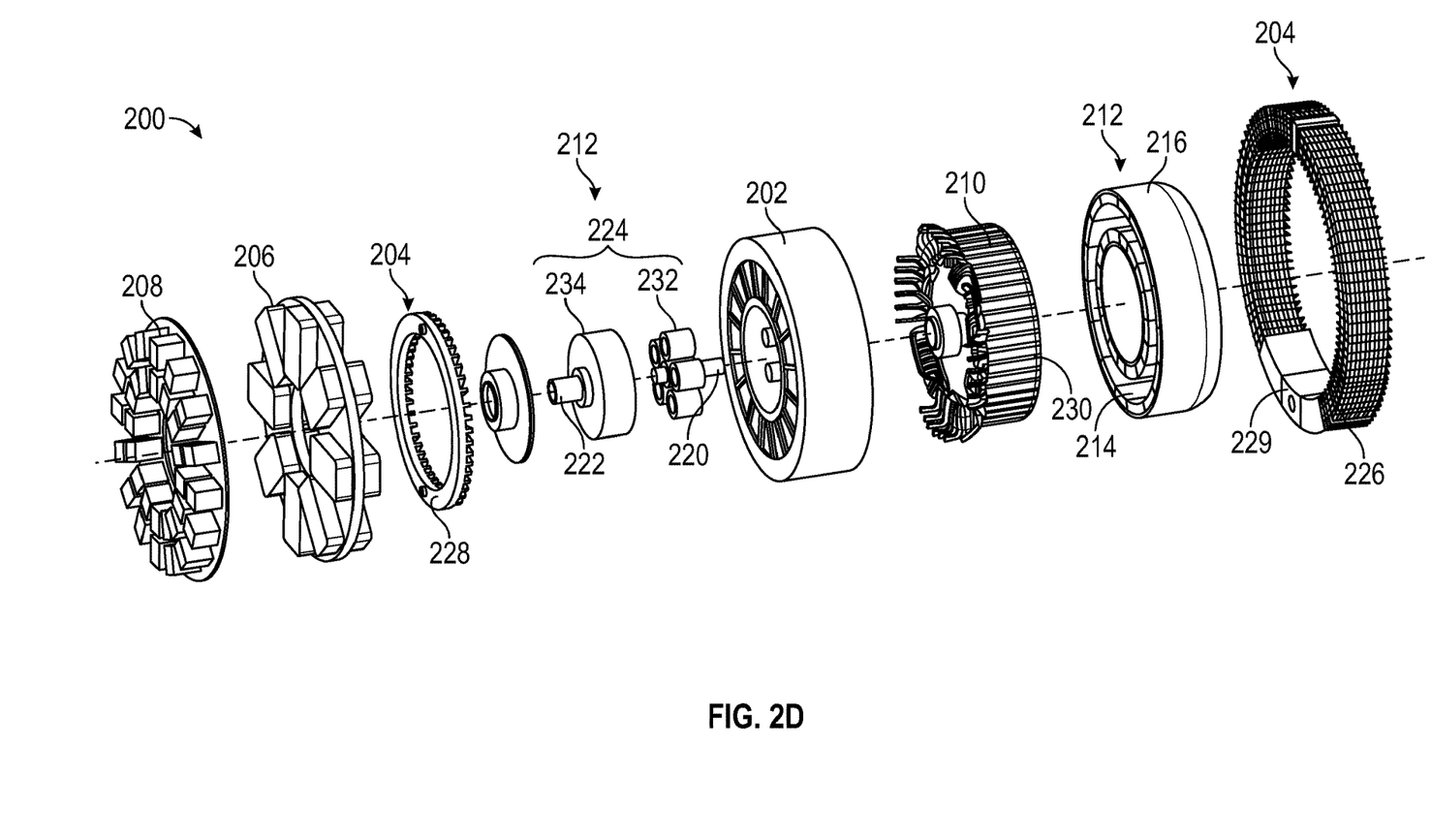
FIG. 2D is a separated-component illustration of the aircraft electric motor of FIG. 2A.

Turning now to FIGS. 2A-2D, schematic illustrations of an aircraft electric motor 200 in accordance with an embodiment of the present disclosure are shown. FIG. 2A is an isometric illustration of the aircraft electric motor 200, FIG. 2B is a side elevation view of the aircraft electric motor 200, FIG. 2C is a partial cut-away view illustrating internal components of the aircraft electric motor 200, and FIG. 2D is a schematic illustration of components of the aircraft electric motor 200 as separated from each other. The aircraft electric motor 200 includes a motor housing 202, a cooling system 204, a first power module system 206, and a second power module system 208.

The motor housing 202 houses a stator 210 and a rotor 212, with the rotor 212 configured to be rotatable about the stator 210. In this illustrative embodiment, the rotor 212 includes a U-shaped magnet 214 arranged within a similarly shaped U-shaped rotor sleeve 216. The rotor sleeve 216 is operably connected to a hub 218. The hub 218 is fixedly attached to a first shaft 220. The first shaft 220 is operably connected to a second shaft 222. In some configurations, the first shaft 220 may be a high speed shaft and may be referred to as an input shaft. In such configurations, the second shaft 222 may be a low speed shaft and may be referred to as an output shaft. The connection between the first shaft 220 and the second shaft 222 may be by a gear assembly 224, as described herein.

The cooling system 204 is configured to provide cooling to the components of the aircraft electric motor 200. The cooling system 204, as shown in FIG. 2D, includes a heat exchanger 226 and a header 228. The heat exchanger 226 and the header 228 may form a closed-loop cooling system that may provide air-cooling to a working fluid at the heat exchanger 226. The header 228 may be, in some configurations, a two-phase di-electric cooling header. A cooled working fluid may be pumped from the heat exchanger 226 into the header 228 using a pump 229 and distributed into embedded cooling channels 230 that are arranged within the stator 210. As the aircraft electric motor 200 is operated, heat is generated and picked up by the working fluid within the embedded cooling channels 230. This heated working fluid is then passed through the header 228 back to the heat exchanger 226 to be cooled, such as by air cooling. Although described as air-cooling, other cooling processes may be employed without departing from the scope of the present disclosure.

As shown, the heat exchanger 226 of the cooling system 204 may be a circular structure that is arranged about the motor housing 202. This configuration and arrangement allows for improved compactness of the system, which may be advantageous for aircraft applications. The rotor sleeve 216 with the magnets 214, the stator 210, and the gear assembly 224 fit together (although moveable relative to each other) within the motor housing 202, providing for a compact (low volume/size) design.

As noted above, the rotor sleeve 216 may be operably coupled to a first shaft 220 by the hub 218. The first shaft 220 may be operably coupled to a first gear element 232 and the second shaft 222 may be operably coupled to a second gear element 234. The first and second gear elements 232, 234 may form the gear assembly 224. The first and second gear elements 232, 234 are arranged to transfer rotational movement from the first shaft 220, which is driven in rotation by the hub 218 and the rotor sleeve 216 of the rotor 212, to the second shaft 222. In some embodiments, the first shaft 220 may be operably connected to a sun gear as the first gear element 232 that engages with a plurality of planetary gears and drives rotation of the second gear element 234 which may be operably connected to the second shaft 222. In some embodiments, the second shaft 222 may be connected to a fan or other component to be rotated by the aircraft electric motor 200.

The aircraft electric motor 200 includes the first power module system 206 and the second power module system 208. The first and second power module systems 206, 208 can include capacitors and other electronics, including, but not limited to, printed circuit boards (PCBs) that may enable control and operation of the aircraft electric motor 200. As such, the first and second power module systems 206, 208 may form at least a part of a drive unit of the aircraft electric motor 200. The profile of the aircraft electric motor 200 of the present disclosure presents a low profile or compact arrangement that reduces the volume of the entire power system, which in turn can provide for improved weight reductions. In some embodiments, the first and second power module systems 206, 208 may be electrically connected to the stator 210 to cause an electric current therein. As the electric current will induce an electromagnetic field which will cause the rotor 212 to rotate.

Figure 3A:
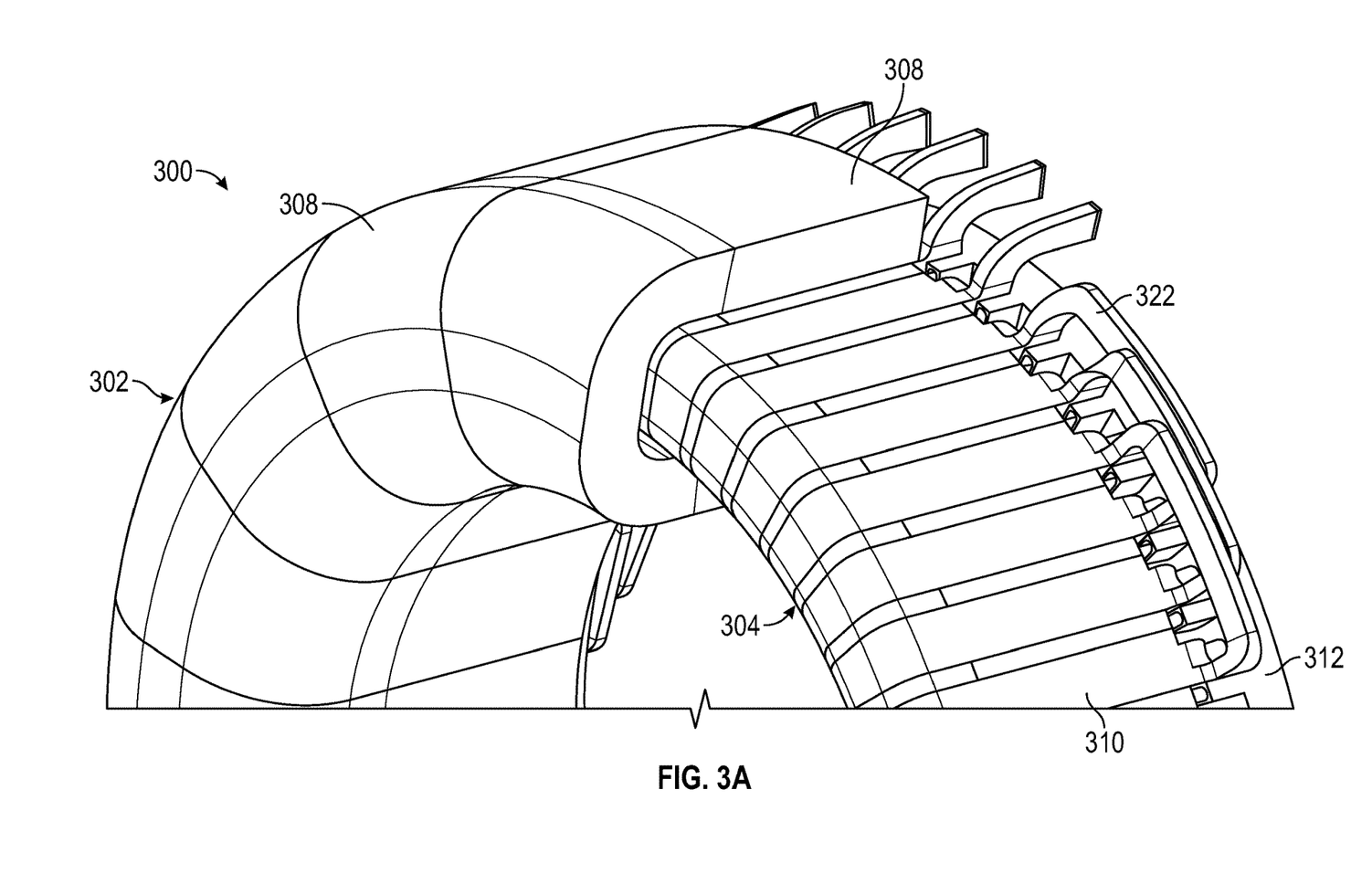
FIG. 3A is a schematic illustration of a rotor and stator of an aircraft electric motor in accordance with an embodiment of the present disclosure.
Figure 3B:
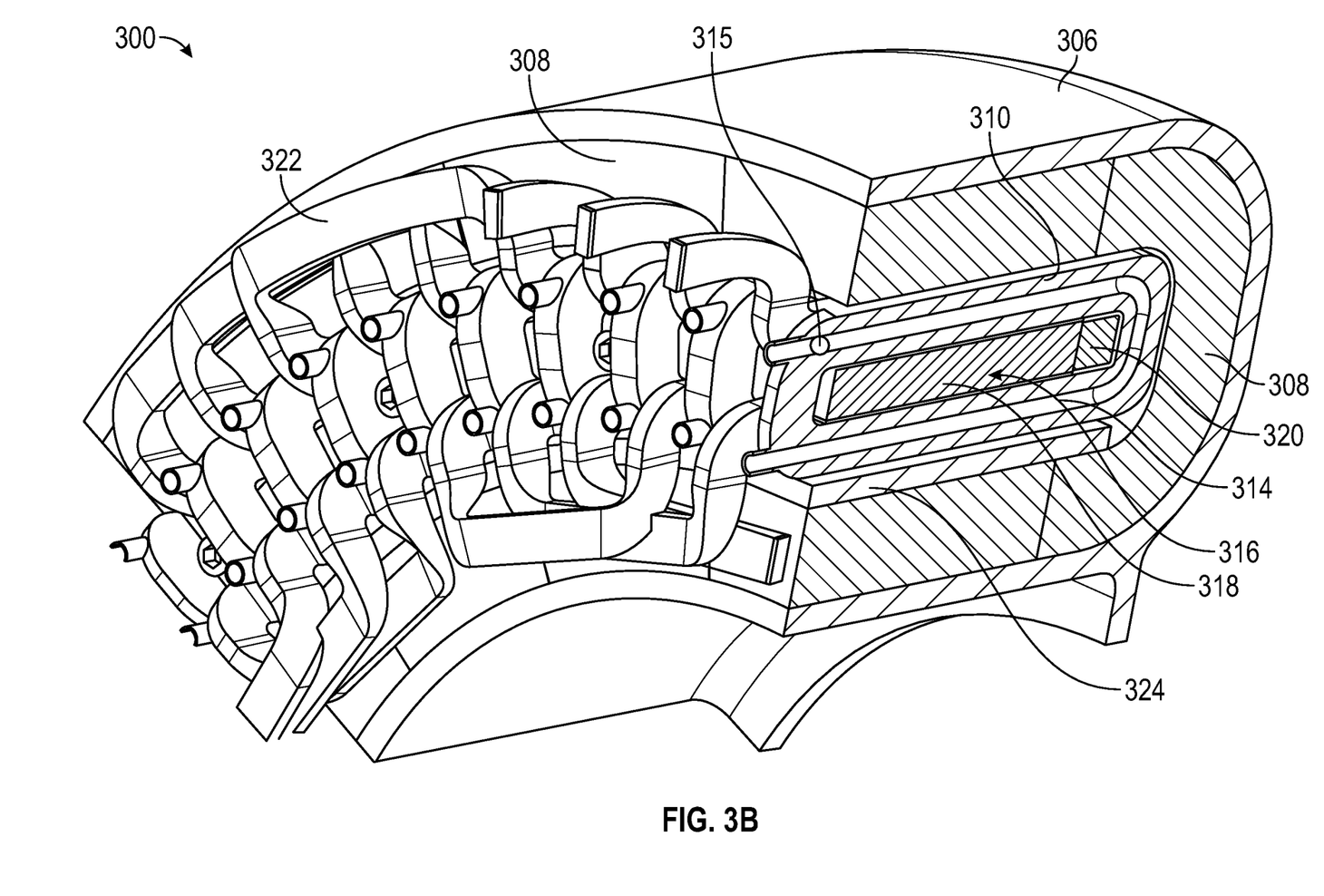
FIG. 3B is a schematic illustration of the rotor and stator of FIG. 3A as arranged within a rotor sleeve in accordance with an embodiment of the present disclosure.

Referring now to FIGS. 3A-3B, schematic illustrations of a portion of an aircraft electric motor 300 in accordance with an embodiment of the present disclosure is shown. FIGS. 3A-3B illustrate a portion of a rotor 302 and a stator 304 of the aircraft electric motor 300. FIG. 3A illustrates the rotor 302 and the stator 304 and FIG. 3B illustrates these components arranged within a rotor sleeve 306.

The rotor 302 is formed of a plurality of U-shaped magnets 308. In some configurations, the plurality of magnets 308 can be arranged with alternating polarity in a circular or annular structure. Arranged within the "U" of the U-shaped magnets 308 is the stator 304. The stator 304 is formed of a plurality of windings 310. In this configuration, the windings 310 are arranged with a header 312. The header 312 may be part of a cooling system, such as that shown and described above. The header 312 can be configured to cycle a working fluid through cooling channels 314 for cooling of the windings 310, as shown in FIG. 3B. As shown in FIG. 3B, the cooling channels 314 may include a flow restrictor 315 arranged at an inlet side (or an outlet side) of the cooling channel 314. The flow restrictor 315 may be used to throttle the flow of a cooling fluid to provide efficient cooling within the cooling channels 314.

The windings 310 may be wrapped about a support structure 316. The support structure 316, in some embodiments and as shown in FIG. 3B, may include a laminate portion 318 and a magnetic portion 320. In some such embodiments, the laminate portion 318 may be formed from cobalt steel laminate and the magnetic portion 320 may be formed from a soft magnetic composite. The laminate portion 318 may be provided to capture in-plane flux from outer and inner rotor. The magnetic portion 320 may be provided to capture end rotor flux and may take a shape/filler in a gap through the end turns of the coil. The windings 308 include end connections 322 and may be electrically connected to one or more power module systems of the aircraft electric motor, such as shown above.

As shown in FIG. 3B, the magnets 306 are U-shaped and arranged within the rotor sleeve 306. The rotor sleeve 306 is a substantially U-shaped sleeve that is sized and shaped to receive the U-shaped magnets 308. In this illustrative configuration, the rotor sleeve 306 can include an inner sleeve 324. The inner sleeve 324 may be configured to provide support to a portion of the magnets 308. It will be appreciated that there is no direct contact between the windings 310 and the magnets 308. This lack of contact enables free rotation of the rotor 302 relative to the stator 304 during operation.

High-power-density aviation-class electric motor and drives, such as those shown and described above, may require advanced cooling technologies. These machines are generally thermally limited at high power ratings and their performance can be improved by mitigating thermal limitations. Accordingly, embodiments of the present disclosure are directed to improved cooling schemes for aircraft electric motors (e.g., as described above). Embodiments of the present disclosure are directed to employing a two-phase cooling scheme to improve cooling at high load locations (e.g., within windings of the motor). Two-phase cooling is a highly efficient approach for cooling the heat generating components. Non-uniform flow (e.g., liquid/vapor phase) distribution, where some channels receive insufficient liquid coolant, is a critical risk in a two-phase cooling approach. Both to improve flow distribution in motor channels and to optimize overall performance of the thermal management system, the loop architecture in accordance with embodiments of the present disclosure can be optimized so that the more critical components receive more coolant liquid (as compared to vapor or a mixture).

High-power-density aviation-class electric motor and drives, as described above, may require advanced cooling technologies. These machines are generally thermally limited at high power ratings and their performance can be improved by mitigating thermal limitations. Two-phase cooling is a highly efficient approach for cooling the heat generating components. In accordance with embodiments of the present disclosure, a cooling refrigerant is configured to boil and evaporate within embedded micro-channels in the electric components such as the winding. The boiling of the refrigerant within he microchannels can result in reverse flow (backflow) in channels and subsequent local dry out. As such, embodiments of the present disclosure are configured to ensure a consistent flow direction and minimize or prevent backflow of the fluid.

In accordance with embodiments of the present disclosure, channel surfaces of cooling channels embedded or formed within windings of an aircraft electric motor are enhanced with three dimensional features that both enhance heat transfer and preferentially direct flow in one direction. These features may have much higher flow resistance (pressure drop) in one direction compared to the reverse direction. The surfaces/channels described herein may be fabricated through additive processes, machining, casting, or through other manufacturing processes. The features described herein may be local. For example, such features may be arranged near an entrance/inlet of a channel or distributed intermittently along the channel, etc. In other configurations, the features may be present along a full length from inlet to outlet of a given cooling channel. The features may be sized locally based on vapor quality.

Figure 4:
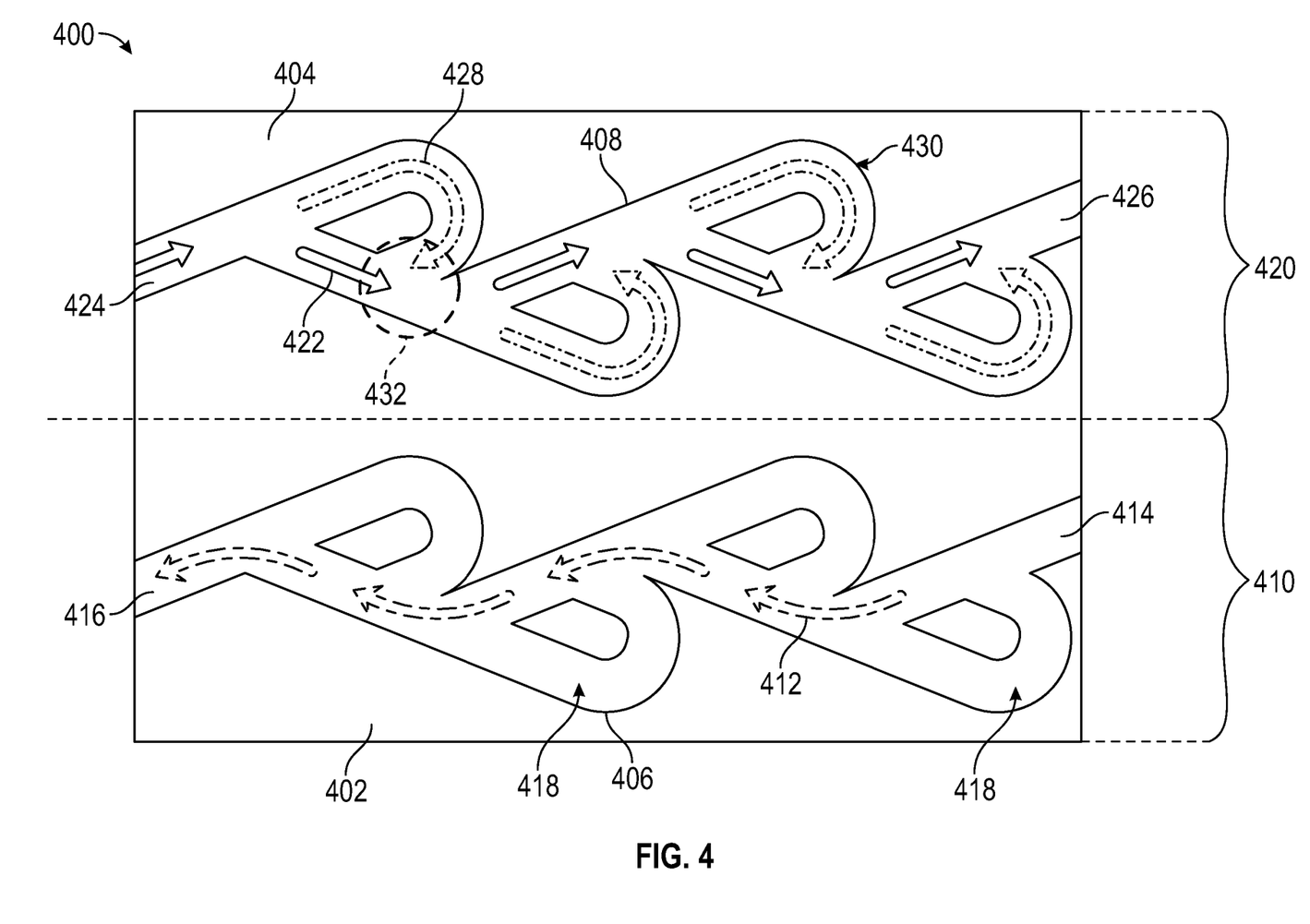
FIG. 4 is a schematic illustration of a portion of an aircraft electric motor system in accordance with an embodiment of the present disclosure.

Turning now to FIG. 4, a schematic illustration of example flow channels for use in an aircraft electric motor 400 in accordance with an embodiment of the present disclosure is shown. FIG. 4 illustrates a portion of a first winding 402 and a second winding 404 that may be part of a stator portion of an aircraft electric motor of the present disclosure. The first winding 402 includes a respective first preferential direction cooling channel 406 and the second winding 404 includes a respective second preferential direction cooling channel 408. As shown, each of the first preferential direction cooling channel 406 and the second preferential direction cooling channel 408 are configured as Tesla valve configurations.

In FIG. 4, the first preferential direction cooling channel 406 has a first flow configuration 410 which has a cooling fluid 412 flow from an inlet 414 to an outlet 416. In the first flow configuration 410, the fluid flow of the cooling fluid 412 is in a preferential flow direction (from inlet 414 to outlet 416) that minimizes trapping fluid or causing backflow. The first preferential direction cooling channel 406 includes branches 418 which may allow for pockets of boiling cooling fluid 412 to expand without causing the turbulent flow that would induce or cause backflow. The cooling fluid may be a saturated refrigerant (e.g., dielectric refrigerants including, but not limited to, hydrofluorocarbons (HFC), hydrofluro-olefins (HFO), and/or hydrofluoroethers (HFE)).

In contrast, in a second flow configuration 420, the flow of a cooling fluid 422 is from an inlet 424 toward an outlet 426 that is the opposite of that in the first flow configuration 410. The geometric shape of the second preferential direction cooling channel 408 is the same as that of the first preferential direction cooling channel 406, but the flow direction is reversed. As such, when a portion 428 of the cooling fluid 422 enters branches 430 (e.g., due to boiling of the cooling fluid 422), the fluid may flow about and reverse direction and cause a turbulent flow at a junction 432. This turbulence is the result of a backflow or a flow of the cooling fluid 422 flowing in a direction opposite of the primary flow (e.g., in a direction from the outlet 426 toward the inlet 424).

The first flow configuration 410 is a preferential flow, such that the orientation of the features of the first preferential direction cooling channel 406 are arranged to minimize backflow while allowing for improved cooling to the surrounding first winding 402. By ensuring a preferential flow direction and minimal disruption, improved heat removal may be achieved, thus increasing the amount of cooling provided by the cooling channels. In the configuration of FIG. 4, the cooling channels are arranged as Tesla valves. Such valves allow fluid to flow unimpeded in one direction (e.g., inlet 414 toward outlet 416), but in the other direction, the fluid is blocked or prevented from flowing in such opposite direction. The interior of the cooling channels are provided with enlargements, recesses, projections, baffles, or buckets which, while offering virtually no resistance to the passage of the cooling fluid in one direction, other than surface friction, constitute an almost impassable barrier to its flow in the opposite direction.

The preferential direction cooling channels of the present disclosure are not limited to Tesla valve configurations. For example, toothed configurations, groves, helical grooves or embedded channels, rings, or the like may be used to provide a preferential direction feature within and/or along a cooling channel.

Figure 5:
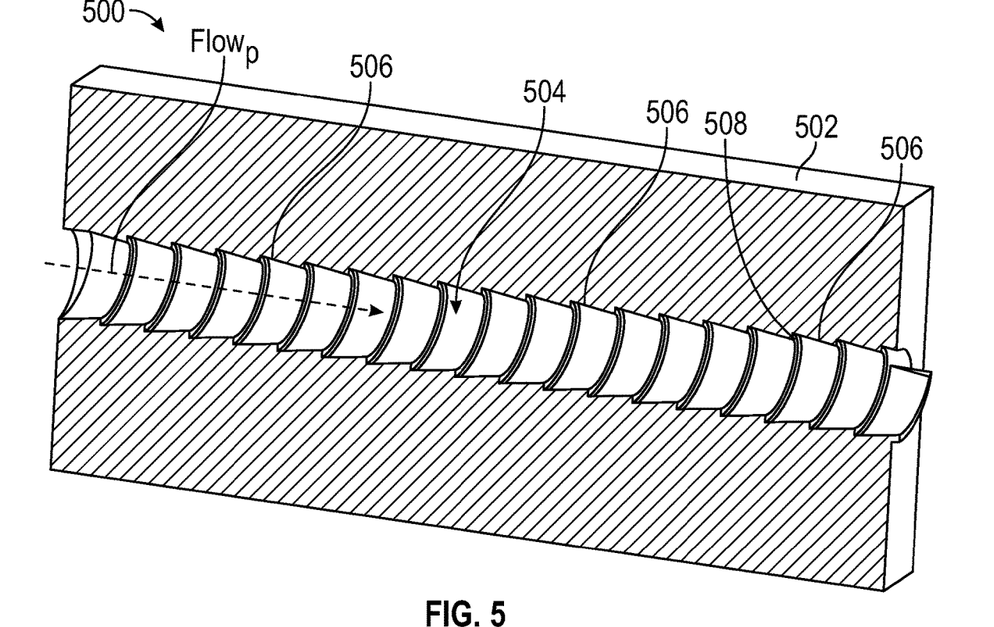
FIG. 5 is a schematic illustration of a portion of an aircraft electric motor system in accordance with an embodiment of the present disclosure.

For example, with reference to FIG. 5, a schematic illustration of a portion of an aircraft electric motor 500 in accordance with an embodiment of the present disclosure is shown. In FIG. 5, a winding 502 is shown having a preferential flow direction cooling channel 504 passing therethrough. The winding 502 may be part of a stator of an aircraft electric motor of the present disclosure, such as shown and described above. The preferential flow direction cooling channel 504 defines a preferential flow direction Flow$_p$. The preferential flow direction cooling channel 504 is defined by directional features 506 that include, in this embodiment, a flow prevention element 508. The flow prevention element 508 is a structural feature of the exterior wall defining the preferential flow direction cooling channel 504. The flow prevention element 508 of a given directional feature 506 may be a land of a thread or ring shape that has a larger diameter than an upstream directional feature 506. As such, flow in a direction counter to the preferential flow direction Flow n will be discouraged (e.g., minimized or eliminated). In the ring configuration, each ring structure has an angled sidewall that has a larger diameter than an upstream directional feature at the upstream end of the angled sidewall.

Figure 6:
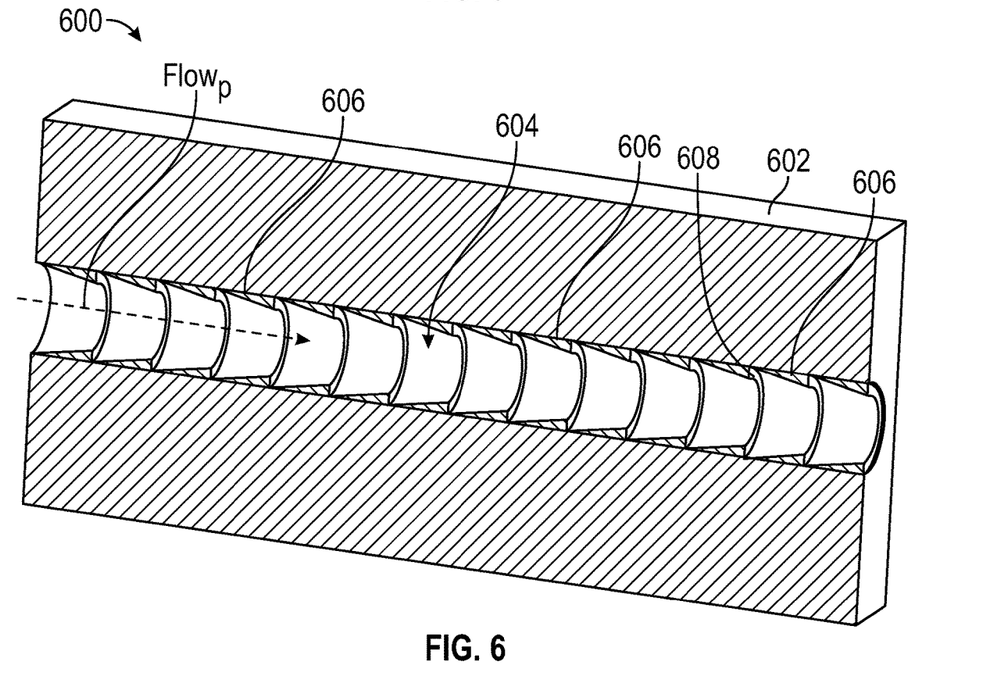
FIG. 6 is a schematic illustration of a portion of an aircraft electric motor system in accordance with an embodiment of the present disclosure.

With reference to FIG. 6, a schematic illustration of a portion of an aircraft electric motor 600 in accordance with an embodiment of the present disclosure is shown. In FIG. 6, a winding 602 is shown having a preferential flow direction cooling channel 604 passing therethrough. The winding 602 may be part of a stator of an aircraft electric motor of the present disclosure, such as shown and described above. The preferential flow direction cooling channel 604 defines a preferential flow direction Flow$_p$. The preferential flow direction cooling channel 604 is defined by directional features 606 that include, in this embodiment, a flow prevention element 608. The flow prevention element 608 is a structural feature of the exterior wall defining the preferential flow direction cooling channel 604. The flow prevention element 608 of a given directional feature 606 may be a flat face of a tooth or thread that has a smaller diameter than an upstream directional feature 606. As such, flow in a direction counter to the preferential flow direction Flow n will be discouraged (e.g., minimized or eliminated).

Figure 7:
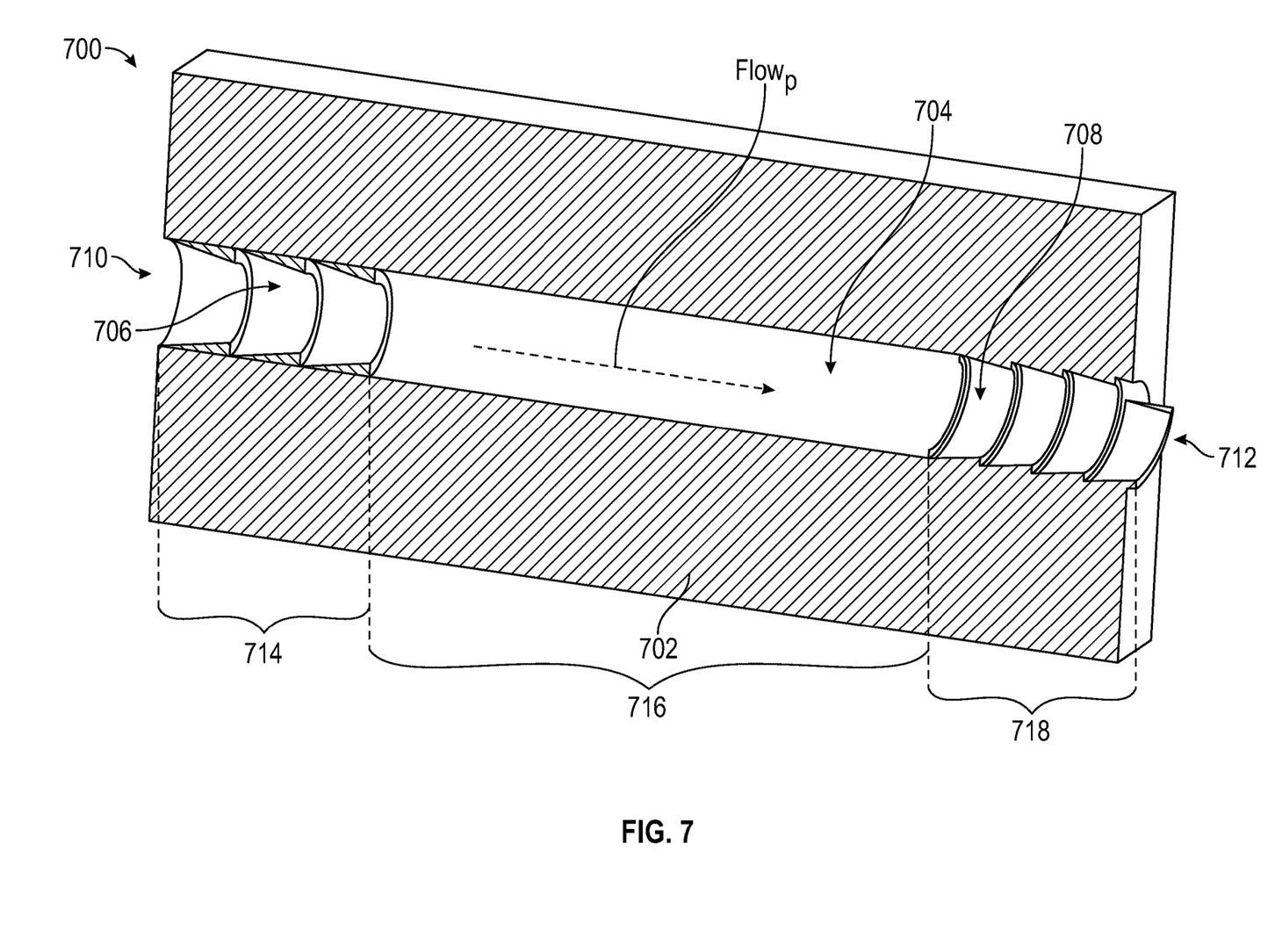
FIG. 7 is a schematic illustration of a portion of an aircraft electric motor system in accordance with an embodiment of the present disclosure.

With reference to FIG. 7, a schematic illustration of a portion of an aircraft electric motor 700 in accordance with an embodiment of the present disclosure is shown. In FIG. 7, a winding 702 is shown having a preferential flow direction cooling channel 704 passing therethrough. The winding 702 may be part of a stator of an aircraft electric motor of the present disclosure, such as shown and described above. The preferential flow direction cooling channel 704 defines a preferential flow direction Flow$_p$. The preferential flow direction cooling channel 704 is defined by directional features 706, 708. A first set of directional features 706 are arranged proximate an inlet end 710 of the preferential flow direction cooling channel 704 and a second set of directional features 708 are arranged proximate an outlet end 712 of the preferential flow direction cooling channel 704. The preferential flow direction cooling channel 704 also includes a portion that has not preferential direction features. As such, in this illustratively embodiment, the preferential flow direction cooling channel 704 has an inlet portion 714 including the first set of directional features 706, a mid-channel portion 716 having no directional features, and an outlet portion 718 including the second set of directional features 708.

In this illustrative embodiment, the first set of directional features 706 have a different structural configuration than the second set of directional features 708. In other embodiments, the directional features at the inlet end 710 and the outlet end 712 may be substantially similar. The selection of the specific configuration of the directional features 706, 708 at the inlet portion 714, the outlet portion 718, or the inclusion or absence of such features in the mid-channel portion 716, may be selected to achieve a desired cooling flow and cooling load. Further, the Tesla valve configuration illustrated in FIG. 4 may be combined with other (different) directional features, as will be appreciated by those of skill in the art in view of the teachings herein. Further, the length of the respective portions 714, 716, 718 may be varied to achieve desired cooling properties. For example, a series of different (or similar) directional features may be distributed along the length of a cooling channel, with sections or portions of smooth channel between the sets of directional features.

Figure 8:
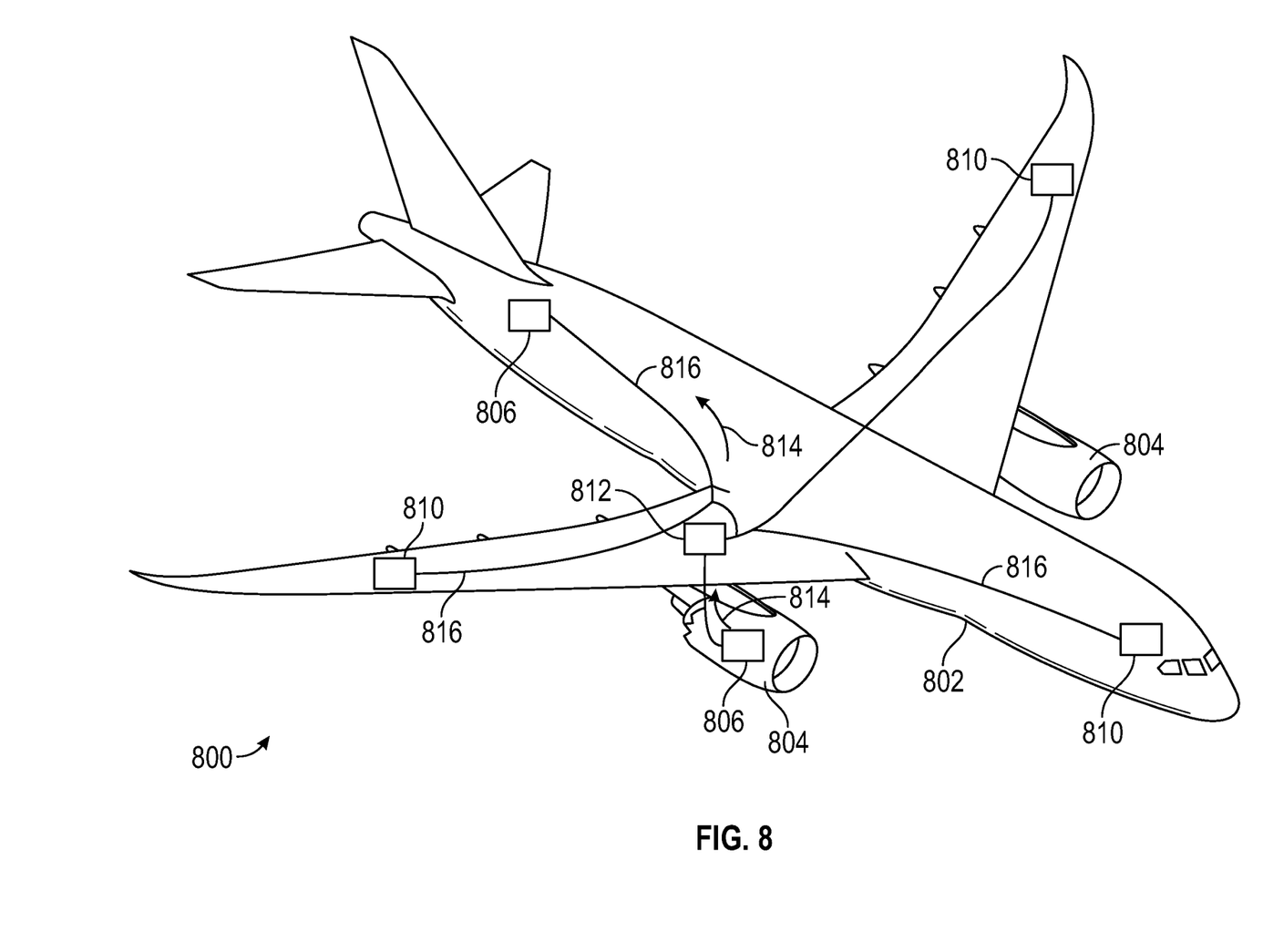
FIG. 8 is a schematic view of a power system of an aircraft that may employ embodiments of the present disclosure.

Referring now to FIG. 8, a power system 800 of an aircraft 802 is shown. The power system 800 includes one or more engines 804, one or more electric motors 806, a power bus electrically connecting the various power sources 804, 806, and a plurality of electrical devices 810 that may be powered by the engines 804 and/or motors 806. The power system 800 includes a power distribution system 812 that distributes power 814 through power lines or cables 816. The electric motors 806 of the aircraft 802 may be configured similar to the aircraft electric motors shown and described above.

Advantageously, embodiments of the present disclosure provide for improved electric motors for aircraft and aviation applications. The aircraft electric motors of the present disclosure have improved cooling channels that may improve cooling while eliminating or at least reducing the challenges with cooling windings of aircraft electric motors. For example, advantageously, embodiments of the present disclosure may prevent backflow within the cooling fluid flow, which may be detrimental or at least reduce efficiencies of the cooling.

The terms "about" and "substantially" are intended to include the degree of error associated with measurement of the particular quantity based upon the equipment available at the time of filing the application. For example, "about" or "substantially" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft electric motor comprising:
   a motor unit having a rotor and a stator, wherein the stator includes a plurality of windings and cooling channels arranged to provide cooling to the plurality of windings;
   a drive unit configured to drive operation of the motor unit; and
   a cooling system comprising:
      at least one directional feature forming a portion of at least one cooling channel, the at least one directional feature configured to prevent backflow of a cooling fluid that passes through the at least one cooling channel,
      wherein the at least one cooling channel defines an inlet portion comprising an inlet, a mid-channel portion, and an outlet portion comprising an outlet,
      wherein the at least one directional feature comprises at least one feature in the inlet portion and at least one feature in the outlet portion, and
      wherein the at least one feature within the inlet portion is different from the at least one feature in the outlet portion.

2. The aircraft electric motor of claim 1, wherein the at least one directional feature comprises a plurality of directional features distributed between the inlet of the at least one cooling channel to the outlet of the at least one cooling channel.

3. The aircraft electric motor of claim 1, wherein the at least one directional feature comprises a Tesla valve.

4. The aircraft electric motor of claim 1, wherein the at least one directional feature comprises a series of helical grooves.

5. The aircraft electric motor of claim 1, wherein the at least one directional feature comprises a series of rings, wherein each ring has an angled sidewall that has a larger diameter than an upstream directional feature at the upstream end of the angled sidewall.

6. The aircraft electric motor of claim 1, wherein the at least one directional feature comprises a feature located within the mid-channel portion.

7. The aircraft electric motor of claim 1, wherein the mid-channel portion does not include any directional features.

8. The aircraft electric motor of claim 1, wherein the windings are arranged in a U-shape configuration.

9. The aircraft electric motor of claim 1, wherein the cooling system further comprises:
   a header and a heat exchanger configured to supply cooling fluid into the plurality of cooling channels.

10. The aircraft electric motor of claim 9, further comprising a pump configured to pump the cooling fluid from the header into the plurality of cooling channels.

11. The aircraft electric motor of claim 1, wherein the rotor and stator are arranged in an annular configuration.

12. The aircraft electric motor of claim 1, wherein the at least one directional feature is configured to cause a phase change in the cooling fluid.

13. An aircraft electric motor comprising:
   a motor unit having a rotor and a stator, wherein the stator includes a plurality of windings and cooling channels arranged to provide cooling to the plurality of windings;
   a means for driving operation of the motor unit; and
   a cooling system comprising:
      at least one means for supplying cooling fluid to a portion of the stator; and
      at least one means for preventing backflow of the cooling fluid within the at least one means for supplying cooling fluid,
      wherein the at least one means for supplying cooling fluid comprises a cooling channel having an inlet portion comprising an inlet, a mid-channel portion, and an outlet portion comprising an outlet,
      wherein the at least one means for preventing backflow of the cooling fluid comprises at least one first means for preventing backflow in the inlet portion and at least one second means for preventing backflow in the outlet portion, and
      wherein the at least one first means for preventing backflow is different from the at least one second means for preventing backflow.

14. The aircraft electric motor of claim 13, wherein:
   the means for driving operation of the motor unit comprises at least one power module system,
   the at least one means for supplying cooling fluid comprises at least one cooling channel, and
   the at least one means for preventing backflow is at least one directional feature formed in a respective one of the at least one cooling channel.

15. An aircraft electric motor comprising:
   a motor unit having a rotor and a stator, wherein the stator includes a plurality of windings and cooling channels arranged to provide cooling to the plurality of windings;
   a drive unit configured to drive operation of the motor unit; and
   a cooling system comprising:
   at least one directional feature forming a portion of at least one cooling channel, the at least one directional feature configured to prevent backflow of a cooling fluid that passes through the at least one cooling channel,
   wherein the at least one directional feature comprises at least one of a series of helical grooves and a series of rings, wherein each ring has an angled sidewall that has a larger diameter than an upstream directional feature at the upstream end of the angled sidewall.

16. The aircraft electric motor of claim 15, wherein the at least one directional feature comprises a plurality of directional features distributed between an inlet of the at least one cooling channel to an outlet of the at least one cooling channel.

17. The aircraft electric motor of claim 15, wherein the at least one cooling channel defines an inlet portion, a mid-channel portion, and an outlet portion.

18. The aircraft electric motor of claim 17, wherein the at least one directional feature comprises at least one feature located within the inlet portion or within the outlet portion.

19. The aircraft electric motor of claim 17, wherein the at least one directional feature comprises a feature located within the mid-channel portion.

20. The aircraft electric motor of claim 15, wherein the at least one directional feature is configured to cause a phase change in the cooling fluid.

* * * * *